United States Patent [19]
Ushio et al.
[11] Patent Number: 5,028,951
[45] Date of Patent: Jul. 2, 1991

[54] COPYING APPARATUS

[75] Inventors: Masaru Ushio; Chiharu Kobayashi; Satoshi Sakata; Masanobu Kawano; Seiji Takahashi, all of Hachioji, Japan

[73] Assignee: Konica Corporation, Tokyo, Japan

[21] Appl. No.: 303,487

[22] Filed: Jan. 27, 1989

[30] Foreign Application Priority Data

Jan. 29, 1988 [JP] Japan .................... 63-16818
Jan. 29, 1988 [JP] Japan .................... 63-16819

[51] Int. Cl.⁵ .................... G03B 27/52
[52] U.S. Cl. .................... 355/26; 355/55; 355/56
[58] Field of Search .................... 355/55, 56, 243, 311, 355/324, 24, 26

[56] References Cited

U.S. PATENT DOCUMENTS 4,436,416 3/1984 Negoro et al. .................... 355/57
4,579,444 4/1986 Pinckney et al. .................... 355/243 X
4,763,167 8/1988 Watanabe et al. .................... 355/324 X
4,835,572 5/1989 Ide .................... 355/55 X
4,872,037 10/1989 Kasahara et al. .................... 355/271
4,935,780 6/1990 Yamada .................... 355/235

*Primary Examiner*—Brian W. Brown
*Assistant Examiner*—D. Rutledge
*Attorney, Agent, or Firm*—Frishauf, Holtz, Goodman & Woodward

[57] ABSTRACT

A copying apparatus includes an automatic document feeding unit for sequentially circulating and feeding documents to be copied, an image forming unit for forming images on the documents on both surfaces of each copying paper sheet by an electrophotographic process, a punching/binding unit for punching or binding a plurality of copying paper sheets subjected to image formation, an image shift unit for controlling a paper feed timing of a copying paper sheet with respect to a formation position of a document image, and a control unit for causing the image shift unit to perform image shift when even-numbered pages of documents are copied.

5 Claims, 3 Drawing Sheets

COPYING APPARATUS

BACKGROUND OF THE INVENTION

1. Field of the Invention

The present invention relates to a copying apparatus for automatically feeding documents and punching or binding a predetermined number of copies.

2. Description of the Prior Art

In recent years, various recording apparatuses such as printers and facsimile apparatuses are widely used in various fields as well as copying machines. Of these recording apparatuses, a copying machine tends to have high operation speed and multifunctions. An apparatus for forming a large number of copies using a copying machine and sorting, automatically punching, or folding the copies has been proposed (e.g., Japanese Patent Laid-Open (Kokai) Nos. 61-94180 and 61-84662, and Journal of Electrophotography Society Vol. 24, No. 3 (1985), pp. 188 to 194). In order to record a large number of documents to be recorded at high speed, a circulating type automatic document feeder as disclosed in Japanese Patent Application No. 62-12201 can be combined with a copying machine. In this case, a copying speed is preferably increased as much as possible.

In a conventional exposure method wherein a document is fixed in position and an optical system is moved, a moving distance and moving speed of the optical system is changed in accordance with a copying paper size and a copying magnification, thereby increasing a copying speed. However, an automatic document feeding type copying apparatus to which the present invention is applied performs sync exposure wherein an optical system is fixed in position, and a photosensitive body is synchronously moved while circulating a document. Therefore, in a variable magnification mode such as an enlargement or reduction mode in which a copying speed is determined on the basis of a copying paper size and a copying magnification like in a conventional apparatus, a copying operation may sometimes be disabled.

On the other hand, a copying apparatus which has a function of copying two one-side documents on both front and back surfaces of a copying paper sheet and copying a document having images on both surfaces on one surface of each of two copying paper sheets has also been proposed.

A copying apparatus having many functions described above also has a binding margin forming function since a binding margin is preferably formed on one side of a copy when a set of copies is to be punched or bound. When one-side documents are copied on both the surfaces of a copying paper sheet, binding margins are formed on opposite sides on the front and back surfaces of a copy. For this reason, an image forming position upon formation of an image may be shifted. Image shift can be realized by controlling a paper feed timing of a copying paper sheet with respect to an image formed on a photosensitive body. In order to form binding margins on the same side of the front and back surfaces of a copying paper sheet, image shift need only be performed when an image is formed on either the front or back surface.

Meanwhile, both-side copies which are subjected to punch or binding processing and are delivered from a processing apparatus are preferably stacked in the order of pages from the above.

SUMMARY OF THE INVENTION

The present invention has been made in consideration of the above situation, and has as its first object to provide a sync-exposure type copying apparatus which can perform a copying operation in a variable magnification mode.

It is a second object of the present invention to provide a copying machine which can copy one-side documents on both the surfaces of a copying paper sheet, perform punch or binding processing of copies, and deliver the copies in the order of pages.

In order to achieve the first object, according to the present invention, a copying speed is determined on the basis of a document size, a copying paper size, and a copying magnification.

In order to achieve the second object, according to the present invention, even-numbered pages of documents are copied first, odd-numbered pages are then copied, and image shift is performed when the even-numbered pages are copied.

DETAILED DESCRIPTION OF THE PREFERRED EMBODIMENT

Figure 1:
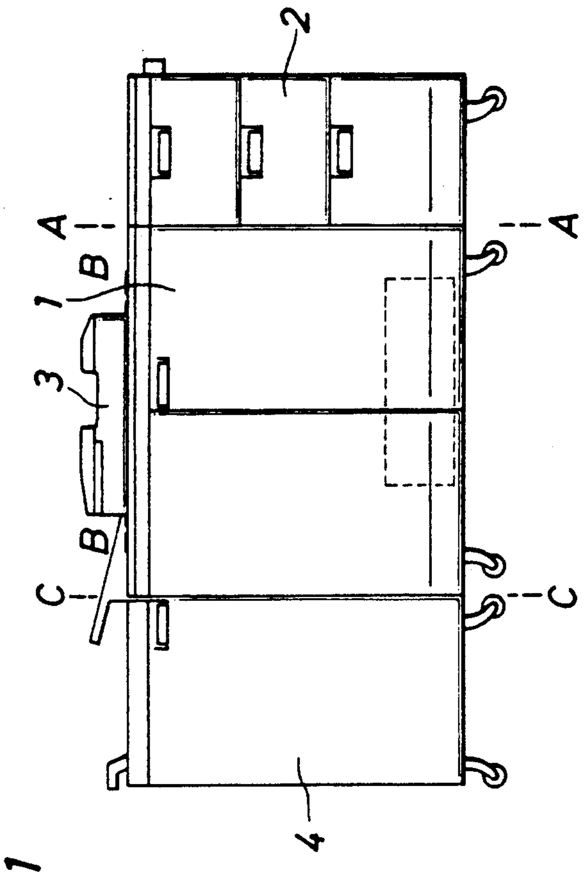
FIG. 1 is a side view showing the overall copying apparatus according to the present invention.

The present invention will now be described with reference to the accompanying drawings.

An embodiment of a copying apparatus according to the present invention is a copying apparatus which is used by combining a copying apparatus body 1, a paper feed unit 2 for feeding copying paper sheets, an automatic document handling apparatus with a reverse function (to be referred to as an RDH apparatus) 3, and a copying paper processing apparatus 4 for binding copies or forming punch holes therein. The copying apparatus body 1 is coupled to the paper feed unit 2 at a position of a broken line A, is coupled to the RDH apparatus 3 at a position of a broken line B, and is coupled to the copying paper processing apparatus 4 at a position of a broken line C. These portions 1, 2, 3, and 4 constituting the copying apparatus respectively have movable portions, and the movable portions are driven by independent drive sources in units of the constituting portions.

Figure 2:
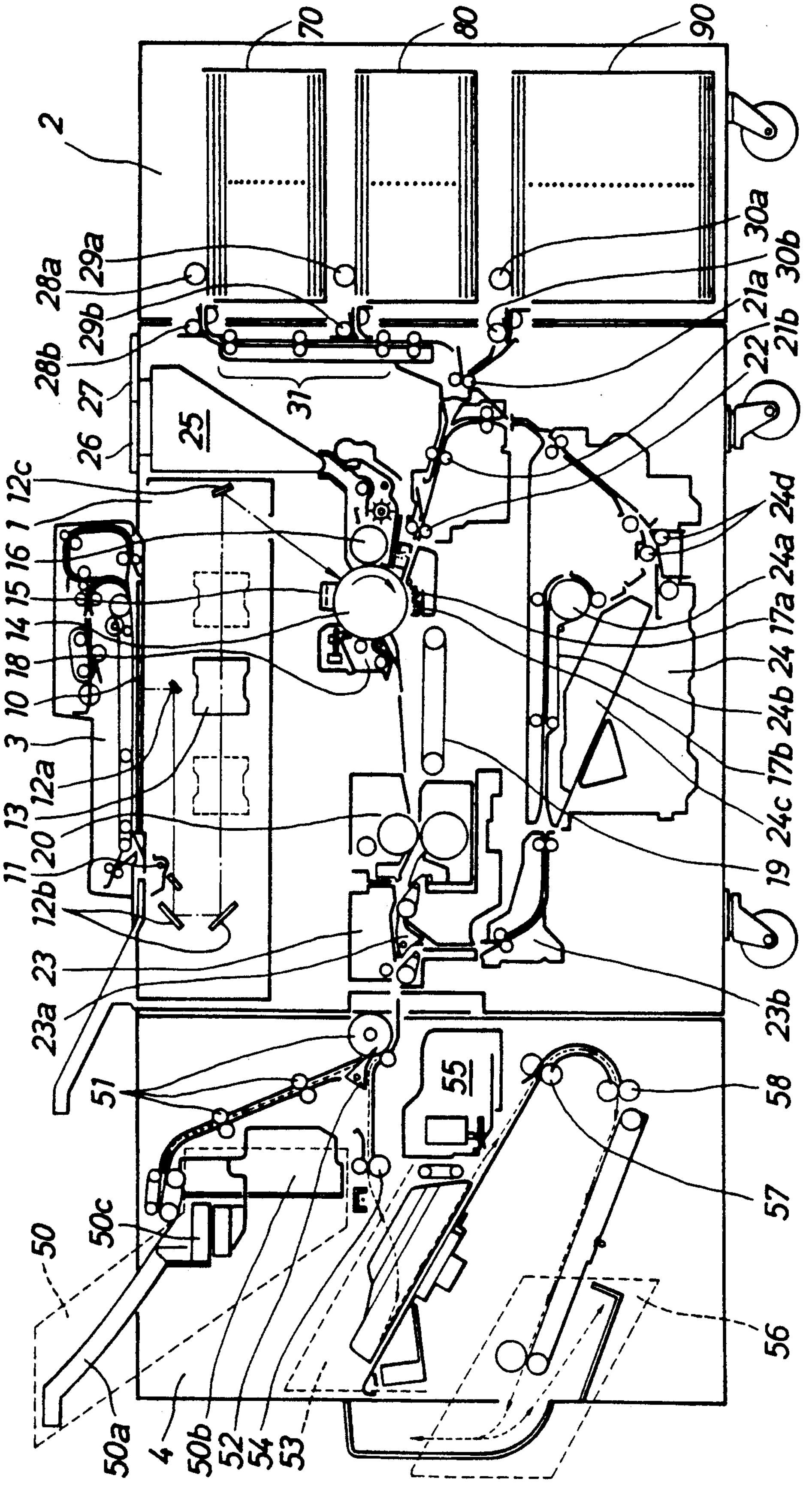
FIG. 2 is a schematic sectional view showing an internal structure of the copying apparatus according to the present invention.

The constituting portions of the copying apparatus will be described below with reference to FIGS. 2 and 3.

(1) Copying Apparatus Body 1

The copying apparatus of this embodiment has a function of selectively copying an image on one or both surfaces of a copying paper sheet. For this purpose, the copying apparatus has a reverse mechanism for reversing or turning over a copying paper sheet, an intermediate stacker for temporarily stacking a reversed copying paper sheet, and a paper feed mechanism for feeding the reversed and stacked copying paper sheet in addition to a normal electrophotographic process.

A mechanism for realizing a normal electrophotographic process comprises an optical system which is arranged below a glass document table 10, arranged on the upper surface of the body 1, for placing a document thereon, and which consists of an exposure lamp 11, mirrors 12*a*, 12*b*, and 12*c*, and a lens system 13, charging electrodes 15 sequentially arranged around a photosensitive drum 14 which rotates in a direction of an arrow in FIG. 2, a magnetic brush type developing unit 16, transfer and discharging electrodes 17*a* and 17*b*, a cleaning unit 18, a conveyor belt 19 for conveying a copying paper sheet after a transfer operation, and a fixing unit 20. Paper feed rollers 21*a* and 21*b* and register rollers 22 are arranged on the side of the paper feed unit 2 when viewed from the photosensitive drum 14. Since these components for the electrophotographic process are known to those who are skilled in the art, a detailed description thereof will be omitted.

A reverse mechanism 23 for reversing a one-side recorded copying paper sheet subjected to fixing in the fixing unit 20 to perform the subsequent back-surface copying operation, is arranged at the downstream side of the fixing unit 20. The paper sheet is reversed by switching the position of a pawl 23*a* which is pivotal about a fulcrum. Reference numeral 23*b* denotes a drive unit for conveying a reversed copying paper sheet toward an intermediate stacker 24.

The intermediate stacker 24 is arranged below the electrophotographic process mechanism, and comprises a conveyor belt 24*b*, driven by a convey roller 24*a*, for conveying and again reversing a one-side recorded copying paper sheet which has been reversed and conveyed by the reverse mechanism 23, a tray 24*c* for temporarily holding the reversed copying paper sheet, and convey rollers 24*d* for conveying the copying paper sheet held by the tray 24*c*.

Paper feed rollers 31 illustrated in the apparatus body 1 near the paper feed unit 2 belong to part of the paper feed unit 2, and enter the body 1 when the paper feed unit 2 is coupled to the apparatus body 1.

Note that reference numeral 25 denotes a toner hopper for replenishing toner.

An operation panel 26 and a display unit 27 are arranged on the upper surface of the apparatus body of this embodiment. The operation panel 26 includes a copying button for starting a copying operation, a stop/clear button for changing a preset copying count or interrupting continuous copying operations, a magnification selection button for switching a copying magnification mode in an equal magnification, enlargement, or reduction mode, a density selection button for changing a copying density, a paper size selection button for selecting a copying paper size, a ten-key pad for setting a copying count, an interruption button depressed when another document is to be copied during continuous copying operations, a punch button depressed when a punch hole is to be formed in a copy, a binding button depressed when copies are to be bound by a binding strip, a binding margin button depressed when a binding margin is to be formed on a copy, a button setting the binding margin on a left or right side of a copy, and the like The display unit 27 displays a paper size, density, magnification, various warnings (paper jam, toner replenishment, too many processing count, and the like), a copying mode (one- or both-side copying operation from one-side document or one- or both-side copying operation from both-side document), messages to be signaled to a user, and the like.

The operation of the reverse mechanism in the both-side copying mode will now be described.

Exposure is performed while a document is fed at a constant speed along the glass document table 10 by the RDH apparatus 3, and a visible image transferred on a copying paper sheet by the electrophotographic process is fixed by the fixing unit 20. In the both-side copying mode, since the pawl 23*a* of the reverse mechanism 23 is pivoted counterclockwise, the copying paper sheet subjected to fixing is not exhausted, and is fed toward the intermediate stacker 24 by the drive unit 23*b*. More specifically, the copying paper sheet having a copied image on one surface is conveyed and reversed by the conveyor belt 24*b*, and is then stacked on the tray 24*c*. In this case, the copying paper sheet is stacked with the fixed copied image facing up.

The one-side copied copying paper sheet stacked in the tray 24*c* is then conveyed toward a transfer position by the convey rollers 24*d*, and stands by at the register rollers 22. Thereafter, the copying paper sheet is fed in synchronism with the operation of the electrophotographic process mechanism, and an image is transferred on a non-copied surface of the copying paper sheet. A new image formed on the copying paper sheet is fixed by the fixing unit 20, and is then exhausted since the pawl 23*a* of the reverse mechanism 23 is pivoted clockwise.

(2) Paper Feed Unit 2

Since the copying apparatus of this embodiment is exemplified as a large-scale copying apparatus capable of forming a large number of copied at once, it has a paper feed unit using large trays 70, 80, and 90 capable of storing a large number of copying paper sheets.

The trays 70, 80, and 90 are of drawer type, as can be seen from FIG. 1, and can store copying paper sheets of the same or different sizes.

Pickup rollers 28*a*, 29*a* and 30*a* are arranged near the paper feed ports of the trays, and a copying paper picked up from the tray by one of these paper feed rollers is fed by a corresponding one of feed rollers 28*b*, 29*b*, and 30*b*. Thereafter, the paper sheet is received by the feed rollers 31, and is then conveyed by the feed rollers 21*a* and 21*b* arranged in the apparatus body 1 to the register rollers 22.

(3)- RDH Apparatus 3

Figure 3:
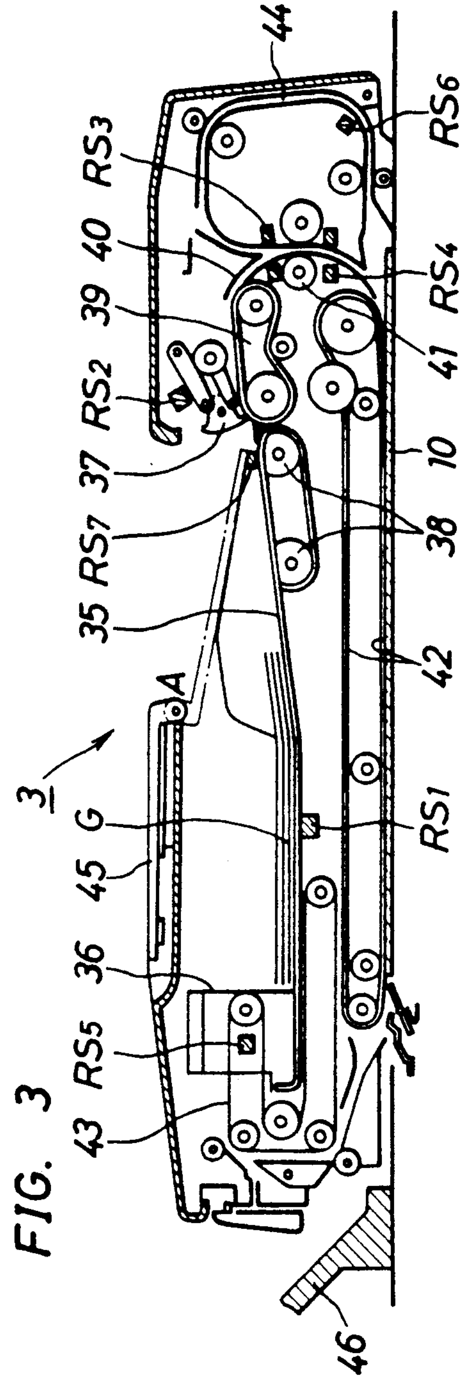
FIG. 3 is a schematic sectional view showing an RDH apparatus constituting part of the copying apparatus according to the present invention.

The RDH apparatus 3 is detachably attached on the glass document table 10 arranged on the upper surface of the copying apparatus body 1, and a plurality of documents G to be copied are placed on a document board 35 while facing up in the order of pages from the above, as shown in detail in FIG. 3. When the documents G are placed on the document board 35, they are detected by a document sensor $RS_1$.

When the copying button provided to the operation panel 26 of the copying apparatus body 1 is depressed, a trailing end regulating plate 36 of the RDH apparatus 3 is moved forward (to the right in FIG. 3), and the overall stack of the documents G is pushed forward. In addition, a gate 37 located on a front path is moved upward. When the documents G are slightly moved forward through the gate 37, the leading ends of the documents are detected by a document leading end sensor $RS_2$, and the gate 37 is moved downward. In addition, the trailing end regulating plate 36 is temporarily stopped.

In this state, a document count operation is started.

A first document (lowermost document) is fed, and when its leading end is detected by a document passage sensor $RS_3$, the document is temporarily stopped. The document feed is restarted in response to an instruction from the apparatus body 1. When the trailing end of the document is detected by a register sensor $RS_4$, the document count is incremented by one. The second and subsequent documents are fed without being temporarily stopped, and are counted up in response to a signal from the register sensor $RS_4$. Note that the trailing end regulating plate 36 is moved backward when the leading end of the first document is detected by the document leading end sensor $RS_2$.

After the documents are counted, document feeding for exposure is started. Semi-circular feed rollers 38 are rotated, and overlapped paper feed preventing rollers 39 are rotated, thereby feeding only the lowermost document. The fed document is moved forward along a guide plate 40. When the leading end of the document is detected by the document passage sensor $RS_3$, the document is temporarily stopped. Thereafter, when a start signal is output form the copying apparatus body 1 at a predetermined timing, the document is restarted, is received by a conveyor belt 42, and is moved along the glass document table 10 of the copying apparatus body 1. The optical system consisting of the lamp 11 for illuminating the document and reflection mirrors 12*b* and 12*c* is arranged below the glass document table 10. The document is exposed by the optical system while being moved, and an image formed thereon is projected onto the photosensitive drum 14 as an optical image (this operation is called sync exposure). When a document trailing end detection signal from the sensor $RS_4$ is supplied to the copying apparatus body 1, feeding of the copying paper sheet from the paper feed unit 2 is started. The document subjected to exposure is received by another conveyor belt 43 when the one-side document copying mode is selected, and is exhausted on the uppermost one of a set of documents G placed on the document board 35. When a paper exhaust sensor $RS_5$ detects the exhausted document, a document feed motor is stopped.

In contrast to this, when the both-side document copying mode is selected, the conveyor belt 42 is driven in the opposite direction upon completion of exposure of one surface of the document so as to guide the document to a guide 44 of a reverse unit. When the trailing end of the document guided to the reverse unit is detected by a trailing end sensor $RS_6$, a drive motor for the conveyor belt 42 is stopped. When the leading end of the document is detected by the document passage sensor $RS_3$, document feeding is temporarily stopped, and the conveyor belt 42 is again driven in the forward direction. Thereafter, the document is restarted in response to a restart signal from the apparatus body 1. Since the document is reversed by the reverse unit and is moved while a surface opposite to the already exposed surface faces the document table 10, the surface is exposed.

Feeding of the second document is started when the first document is detected by the register sensor $RS_4$.

Similarly, when exposure by the optical system of the copying apparatus is completed for third, fourth, . . . documents, i.e., all the documents, the document count=0 is detected by the document leading end sensor $RS_2$. In this manner, feeding corresponding to a set of copies is completed.

When a plurality of (e.g., 5) sets of copies are to be formed, the documents are automatically fed again from the last page, and exposure upon to the first page is sequentially performed. The document feeding operation is repeated by the necessary number of sets.

The RDH apparatus 3 can also perform manual document feeding as well as the above-mentioned automatic document feeding.

In this case, when a manual feed cover 45 is reversed and opened about a point A as a fulcrum to a position indicated by a dotted line, it is detected by a cover reversal sensor $RS_7$, and locking of the overlapped paper preventing rollers 39 is released. Therefore, when a user manually inserts a document along the manual feed cover 45, the document is automatically fed when the leading end sensor $RS_2$. Subsequent document feeding may be the same as that in the automatic feeding mode. However, the document may be stopped on the glass document table, and the optical system may be moved to perform exposure. The document subjected to exposure is exhausted onto a document exhaust tray 46.

In this embodiment, a copying operation can be performed at a predetermined magnification such as an enlargement or reduction magnification by selecting a copying magnification at the operation panel 26 of the copying apparatus body 1.

When a copying magnification is selected by the magnification selection button, the document conveyor belt 42 of the RDH apparatus 3 is moved at a predetermined speed according to the selected magnification. Therefore, if the photosensitive drum 14 of the copying apparatus body 1 is rotated at a constant speed, an enlargement or reduction operation can be performed at a relative speed therebetween.

Normally, in order to vary a magnification such as an enlargement or reduction magnification, a method of changing the rotational speed of a photosensitive drum is employed. If such a method is employed, operation speeds in the electrophotographic process such as charging, developing, transfer, and the like, and the convey speed of a copying paper sheet must be changed. Thus, it is difficult to achieve a small change in speed or to increase a change in speed. In addition, a change in power of the drive system is increased, resulting in cumbersome control. In this embodiment, however, a variable magnification can be achieved by only changing the speed of the conveyor belt 42 of the RDH apparatus 3, thus facilitating control.

(4) Processing Apparatus 4

The processing apparatus 4 is an apparatus for performing punch or binding processing of one- or both-side copied copying paper sheets exhausted from the copying apparatus body 1, and comprises convey rollers 51 for exhausting copies subjected to a copying operation by the copying apparatus body 1 and exhausted therefrom to a shift tray unit 50 without punching or binding them, convey rollers 54 for conveying copies to a stacker unit 53 while switching a path switching gate 52 so as to perform punching or binding, a processing unit 55 for punching or binding a set of copies stacked in the stacker unit 53, and convey rollers 57 and 58 for conveying the punched or bound copies to a final storage tray 56. Of the above-mentioned components, the convey rollers 51, the stacker unit 53, the convey rollers 54, the processing unit 55, the storage tray 56, and the convey rollers 57 and 58 are arranged as independent detachable units for the sake of easy maintenance. For example, the processing unit 55 consists of one puncher and two binders (so-called staplers), and can be independently withdrawn toward the front side of the apparatus (in a direction perpendicular to the drawing surface in FIG. 1). This is to facilitate disposal of punched refuses as a result of punching processing by the puncher, loading or replenishment of binding strips (so-called staples) of the binders, or removal of a jammed binding strip.

Since the detailed structure and operation of the processing apparatus 4 are disclosed in Japanese Patent Application No. 62-12201 by the same applicant as that of the present invention, please refer to this patent application if necessary.

The shift tray unit 50 consists of a lift mechanism **50*b* for moving downward a tray 50*a* on which copying paper sheets are exhausted one by one, and a shift mechanism 50*c* for alternately shifting the tray by a predetermined distance between a near position and a far position (in a direction perpendicular to the drawing surface of FIG. 2) every time documents are circulated once. A shift tray mode can be selected at the operation panel 26 of the copying apparatus body 1**.

Figure 4:
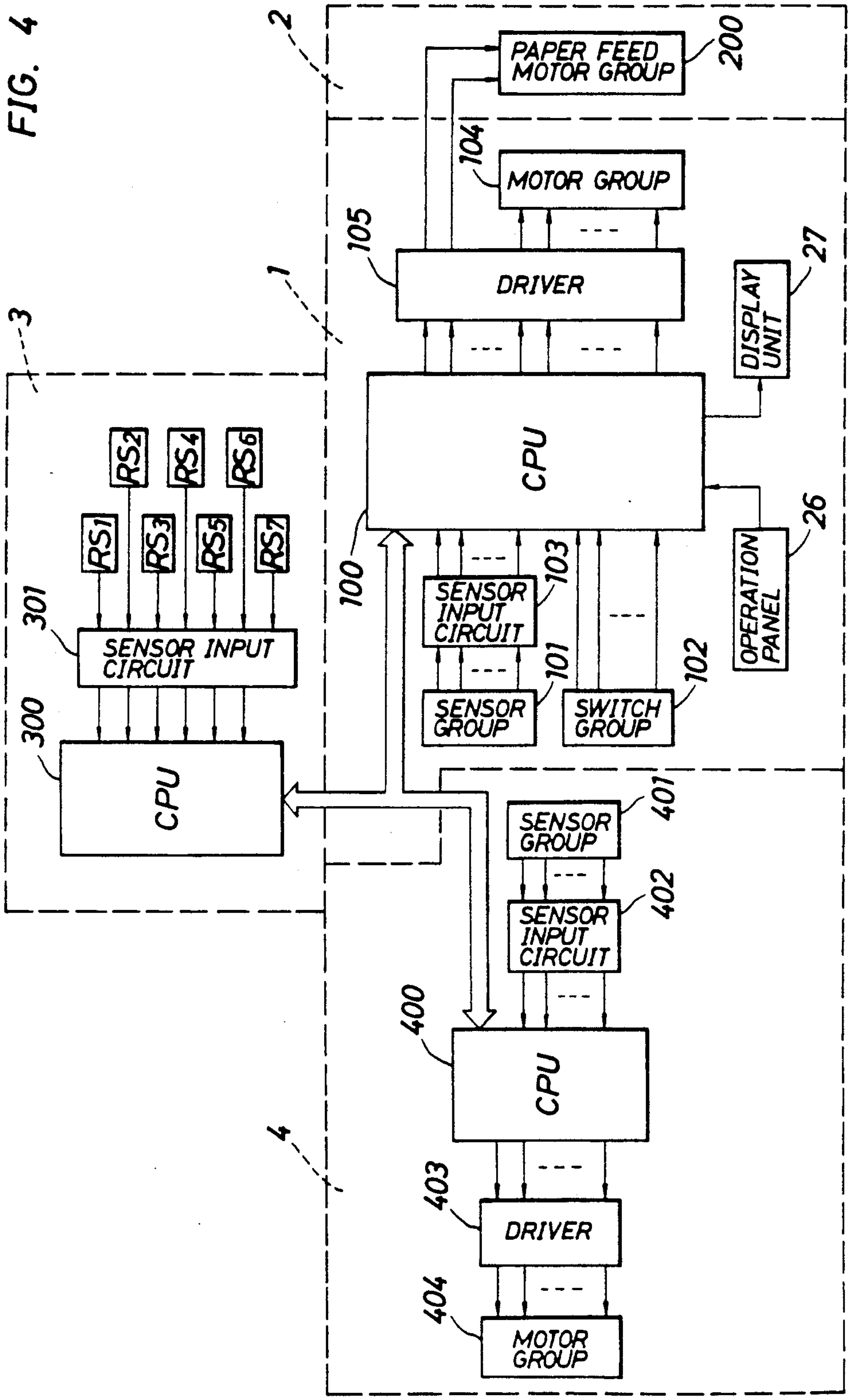
FIG. 4 is a block diagram of a control circuit of the copying apparatus according to the present invention.

FIG. 4 shows a control circuit of the copying apparatus of this embodiment.

In this copying apparatus, the copying apparatus body 1, the paper feed unit 2, the RDH apparatus 3, and the processing apparatus 4 respectively have independent control circuits.

The control circuit of the copying apparatus body 1 comprises a sensor group 101 consisting of microswitches and photosensors, arranged along the convey path of a copying paper sheet, for detecting the leading or trailing end or passage of the copying paper sheet, a switch group 102 including switches which are turned on/off by operation buttons arranged on the operation panel 26 of the apparatus body 1, a sensor input circuit 103 for converting signals from the sensor group 101 into signals which can be processed by a CPU 100, and a driver 105 for driving a motor group 104 for rotating the photosensitive drum 14, a magnetic sleeve of the developing unit, various rollers, and the like.

The paper feed unit 2 has a motor group 200 for driving the pickup rollers **28*a*, 29*a*, and 30*a* for picking up copying paper sheets from the trays 70, 80, and 90, respectively, and the feed rollers 28*b*, 29*b*, and 30*b* for feeding the picked-up paper sheets Rotation and stop of the motor group 200 are controlled in response to an instruction from the control circuit of the copying apparatus body 1**.

The control circuit of the RDH apparatus 3 comprises a CPU 300, the above-mentioned sensors $RS_1$, $RS_2$, . . ., $RS_7$, and a sensor input circuit 301.

The control circuit of the processing apparatus 4 comprises a sensor group 401 consisting of microswitches and photosensors arranged along the convey path of a copying paper sheet, and sensors for detecting operations of the puncher and the binders, a sensor input circuit 402 for converting signals from the sensor group 401 into signals which can be processed by a CPU 400, and a driver 403 for controlling a motor group 404 in accordance with an instruction from the CPU 400.

A copying operation is controlled by exchanging signals among the copying apparatus body 1, the paper feed unit 2, the RDH apparatus 3, and the processing apparatus 4.

The copying operation using the copying apparatus according to this embodiment will now be described.

Documents to be copied are placed on the document board 35 of the RDH apparatus 3 in the order of 1st, 2nd, . . . pages with images facing up.

A copying count, magnification, copying paper size, and density are set and the punching or binding processing mode, one- or both-side copying mode, and the like are selected at the operation panel 26 of the copying apparatus body 1. Thereafter, the copying button is depressed.

The RDH apparatus 3 counts and stores the number of documents, and sequentially feeds the documents from the last page.

The copying apparatus of this embodiment employs a sync exposure method wherein the photosensitive drum is rotated to perform a series of exposure operations while moving documents one by one. In the copying apparatus body 1, an image is formed on the photosensitive drum 14 by the normal electrophotographic process, is transferred and fixed onto a copying paper sheet fed from the paper feed unit 2, and is then sequentially fed to the processing unit 4. In this case, if the both-side copying mode is selected, a copying paper sheet having an image on one surface is reversed by the reverse mechanism 23 in the copying apparatus body 1, and is temporarily stored in the intermediate stacker 24. Thereafter, the stored paper sheet is fed in synchronism with a timing of document feeding by the RDH apparatus, and an image formed on another document is copied on the opposite surface of the copying paper sheet. The copying paper sheet is then fed to the processing apparatus 4.

In the processing apparatus 4, after a set of copying paper sheets are stacked, initially instructed punching or binding processing is performed, and the processed sheets are exhausted onto the storage tray 56. The same operation is repeated by the preset number of sheets, thus completing a series of copying operations.

In this embodiment, when a binding margin is to be formed on a copy, the binding margin button on the operation panel is depressed to designate a right or left binding mode, thus forming a binding margin on the desired side edge of a copy. The binding margin is formed by changing a feed timing of a copying paper sheet fed from the paper feed unit 2 with respect to image formation onto the photosensitive drum 14. When the binding margin is to be formed on the left side edge, the paper feed timing can be advanced, and when the binding margin is to be formed on the right side edge, the paper feed timing can be delayed However, when a both-side copying operation is performed using one-side documents, a binding margin is formed on the front surface of a copying paper sheet on a side opposite to one formed on the back surface when viewed from a feed direction of the copying paper sheet. In this case, image shift must be performed only when an image is copied on one surface of each copying paper sheet. In this embodiment, if such a copying mode is selected, even-numbered pages are copied first, and are temporarily stacked in the intermediate stacker 24 after fixing. Thereafter, odd-numbered pages are copied on the back surfaces. For this reason, image shift is performed when even-numbered pages are copied The image shift operation is realized by controlling a paper feed timing from the register rollers 22.

In the above copying operation, signals are exchanged among the copying apparatus body 1, the RDH apparatus 3, and the processing apparatus 4, and their operations are controlled. Some of the operations will be explained below.

First, detection of document jam occurring in the RDH apparatus 3 and copying operation control in this case will be described below.

The RDH apparatus 3 performs the following jam detection (a) Document Set Jam

When the document leading end sensor $RS_2$ is not turned on within a predetermined period of time after the copying button is turned on, a jam is determined.

In this case, the forward movement of the trailing end regulating plate 36 is stopped, and the document count operation is not performed.

(b) Paper Feed Jam

When the document passage sensor $RS_3$ is not turned on within a predetermined period of time after the document leading end sensor $RS_2$ is turned on or when the register sensor $RS_4$ is not turned on within a predetermined period of time after the document passage sensor RS is turned on, a jam is determined.

In this case, if the number of documents is being counted or the one-side document mode is selected, the RDH apparatus 3 is stopped after the immediately preceding document is exhausted, and the copying apparatus body 1 is stopped after all the copying paper sheets left therein are exhausted if the one-side copying mode is selected. If another mode is selected, the apparatus body 1 is stopped after a copying paper sheet on which an image on the immediately preceding document is copied is exhausted.

(c) Conveyed Paper Jam

When the document exhaust sensor $RS_5$ is not turned on within a predetermined period of time after the register sensor $RS_4$ is turned on, a jam is determined.

In this case, even if the document count mode is being executed or the one- or both-side document mode is selected, the RDH apparatus 3 is immediately stopped. If the one-side copying mode is selected, the copying apparatus body 1 is stopped after all the copying paper sheets left therein are exhausted, and if another copying mode is selected, the apparatus body 1 is immediately stopped.

(d) Exhausted Paper Jam

When the document exhaust sensor $RS_5$ is not turned off within a predetermined period of time after it is turned on, a jam is determined.

In this case, the RDH apparatus 3 immediately stops the document feeding operation in the same manner as in the case (c). The operation of the copying apparatus body 1 is the same as that in the case (c) in the one-side copying mode. However, if the one-side document mode is selected, the apparatus body 1 is immediately stopped. If the both-side document mode is selected, the apparatus body 1 is stopped after a copying paper sheet on which an image on the immediately preceding document is copied is exhausted.

(e) Reversed Paper Jam

When the document passage sensor $RS_3$ is not turned on within a predetermined period of time after the trailing end sensor $RS_6$ is turned on, a jam is determined.

In this case, the RDH apparatus 3 immediately interrupts the document feeding (reverse) operation, and the copying apparatus body 1 is stopped after all the copying paper sheets subjected to processing therein are exhausted or a copying paper sheet on which an image on the immediately preceding document is copied is exhausted.

In this manner, whether or not an optical image is being formed or is not yet formed on the photosensitive drum is determined depending on the position of a document jam in the RDH apparatus 3. Therefore, the movement of the copying paper sheet present in the copying apparatus body 1 is controlled according to a jam state, thus facilitating jam processing.

For the same purpose, when the punching or binding processing mode is selected and a document jam occurs in the RDH apparatus 3, the operation of the copying apparatus body 1 is not immediately stopped, and all the copying paper sheets present in the apparatus body 1 (regardless of completion/incompletion of a copying operation) are exhausted, and are fed to the intermediate stacker of the processing apparatus 4.

In this manner, punching or binding processing can be performed together with copying paper sheets which are copied and stored in the intermediate stacker 53 after jam processing, thus preventing waste of copying paper sheets.

For the same purpose as described above, when a document jam occurs in the shift tray mode, the operations of the copying apparatus body 1 and the processing apparatus 4 are not immediately stopped, and after all the copying paper sheets therein (regardless of completion/incompletion of a copying operation) are exhausted onto the shift tray 50, the operation of the copying apparatus body 1 is stopped. Since the copying paper sheets exhausted onto the shift tray 50 may sometimes include blank paper, a message indicating that blank paper is to be removed is displayed on the display unit 27 of the copying apparatus body 1.

When the copying button is depressed after the punching or binding mode or both the modes are selected at the operation panel 26 of the copying apparatus body 1, document feeding by the RDH apparatus 3 is performed, the copying operation is performed by the electrophotographic process mechanism in the copying apparatus body 1, and a set of copied copying paper sheets are fed into the processing apparatus 4.

In the processing apparatus 4, a stacker paper exhaust sensor (not shown) arranged near the convey rollers 54 detects that copying paper sheets are exhausted onto the intermediate stacker 53. When the stacker paper exhaust sensor detects that last one of a set of copied paper sheets is exhausted onto the intermediate stacker 53, a second copying cycle is started in response to a signal supplied from the CPU of the control circuit of the processing apparatus 4 to the CPU 100 of the control circuit of the copying apparatus body 1 and the CPU 300 of the control circuit of the RDH apparatus 3 after the punching or binding processing is executed by the processing unit 55 in the processing apparatus 4.

In this manner, the next copying cycle is started in synchronism with an end of the punching or binding processing, thus assuring a reliable operation. In addition, the next copying cycle can be started without waiting for exhaust of the paper sheets, thus shortening a processing time.

In the processing apparatus 4, the puncher used for the punching processing and the binders used for the binding processing have mechanical and capacitive limitations, i.e., a maximum number of paper sheets to be processed is limited. For example, the maximum number of paper sheets is 30.

As for the number of documents, documents include one- and both-side documents, and the number of paper sheets to be processed varies depending on the one- or both-side copying mode. In this embodiment, the maximum number of documents is determined as follows.

| Copying Mode | | Maximum Number of Documents |
|---|---|---|
| One-side | One-side | 30 |
| One-side | Both side | 50 |
| Both side | One-side | 15 |
| Both side | One-side | 30 |

Since the RDH apparatus 3 counts the number of documents prior to document feeding, when the CPU 100 of the copying apparatus body 1 receives the document count data from the CPU 300 of the RDH apparatus 3, it checks whether or not the document count exceeds the maximum number determined for each copying mode. If the document count exceeds the maximum number, a warning message indicating this is displayed on the display unit 27, and a series of copying operations starting from document feeding are stopped.

In association with the above-mentioned control, the number of documents counted by the RDH apparatus 3 is temporarily stored in an internal memory of the CPU 300. Thereafter, when document feeding for exposure is started, a count-up operation is performed every time the trailing end of a document is detected by the register sensor $RS_4$. The CPU 300 compares the number of documents which is initially counted and stored, and the number of documents counted when the documents are fed for exposure. If these values are different from each other, the CPU 300 causes the CPU 100 to stop the copying operation, and causes the display unit 27 to display a message requesting checking of the number of documents. In response to this message, a user who checks the number of documents, and restarts the copying operation.

In this embodiment, as described above, manual document feeding can be performed using the RDH apparatus 3.

If a user attempts to perform a manual document feed operation while selecting the punching and binding processing modes, since he or she first reverses the manual feed cover 45 of the RDH apparatus 3, this operation is detected by the cover reversal sensor RS7, and a detection message is supplied from the CPU 300 to the CPU 400. The processing apparatus 4 is controlled to perform only the punching operation and not to perform the binding operation on the basis of data supplied from the copying apparatus body 1 and indicating that the punching and binding modes are selected, and manual feed mode data supplied from the CPU 300.

In this manner, when a user forgets to switch a mode, an unnecessary binding operation can be prevented, and waste of binding strips and damage to the binders can be prevented.

Formation of a binding margin and image shift will be described below.

The binding margin button is depressed at the operation panel 26 of the copying apparatus body 1, and a right or left binding mode is selected by the corresponding button. In this case, a binding margin amount can be set using the ten-key pad. The set binding margin amount is stored in an internal memory of the CPU 100. The CPU 100 supplies a signal to the paper feed motor group 200 at a timing according to the set binding margin amount, thus advancing or delaying a paper feed timing.

When the both-side copying mode using one-side documents is selected at the operation panel 26, the paper feed timing is changed in copying cycles of only even-numbered pages counted by the RDH apparatus 3 to perform image shift when an image is copied on a second surface of each copying paper sheet. In this case, a shift amount is also determined by the set binding margin amount.

In this embodiment, since sync exposure is performed using the RDH apparatus 3, an exposure time is determined based on a document size. A time required for transfer determining a copying speed is determined based on a copying paper size like in a conventional apparatus. When a copying magnification is changed, an exposure time of a document is changed.

Thus, it is effective that the copying speed in this embodiment is determined on the basis of a document size detected by the RDH apparatus, a copying paper size directly selected by a user or determined by a copying magnification, and the copying magnification. For example, in an equal magnification mode, the copying speeds are as follows (unit: number of copies per minute).

| | | Document Size | | | |
|---|---|---|---|---|---|
| | | A3 | B4 | A4 | B5 |
| Copying Paper Size | A3 | 55 | 55 | 55 | 55 |
| | B4 | 55 | 60 | 60 | 60 |
| | A4 | 55 | 60 | 70 | 70 |
| | B5 | 55 | 60 | 70 | 70 |

Copying speeds in an appropriate variable magnification mode between standard sizes (e.g., from A4 to B5) is as follows.

| | | Document Size | | | | |
|---|---|---|---|---|---|---|
| | | A3 | B4 | 8" × 13 | A4 | B5 |
| Copying Paper Size | A3 | 1.0 | 1.15 | — | 1.41 | — |
| | | (55) | (55) | — | (55) | — |
| | B4 | 0.86 | 1.0 | — | 1.22 | 1.41 |
| | | (60) | (60) | — | (60) | (60) |
| | 8" | — | — | 1.0 | — | — |
| | × 13 | — | — | (70) | — | — |
| | A4 | 0.71 | 0.82 | — | 1.0 | 1.15 |
| | | (70) | (70) | — | (70) | (70) |
| | B5 | — | 0.71 | — | 0.86 | 1.0 |
| | | — | (70) | — | (70) | (70) |

Furthermore, copying speeds in a zoom variable magnification mode (0.5 to 1.55 in units of 0.01) can be represented by the copying paper sizes as follows.

| | |
|---|---|
| A3 | 38/min |
| B4 | 40/min |

-continued

| | |
|---|---|
| Other Size (A4, B5) | 43/min |

As described above, according to the present invention, since a copying speed is determined on the basis of a document size, a copying paper size, and a copying magnification, a copying operation can be performed if any copying magnification is selected in a copying apparatus employing a sync exposure method.

According to the present invention, even-numbered pages of documents are copied first, odd-numbered pages are then copied, and image shift is performed when the even-numbered pages are copied. Thus, copies obtained by copying one-side documents on both the surfaces of each copying paper sheet can be exhausted facing up in the order of pages after punching or binding processing.

What we claimed is:

1. A copying apparatus comprising:

automatic document feeding means for sequentially circulating and feeding documents to be copied, said automatic document feeding means feeding a series of one-side documents from a last document, and including means counting the number of the one-side documents prior to feeding of the documents;

image forming means for forming images on said documents on both surfaces of each copying paper sheet by an electrophotographic process;

punching/binding means for punching or binding a plurality of copying paper sheets subjected to image formation;

image shift means for controlling a paper feed timing of a copying paper sheet with respect to a formation position of a document image; and control means for causing said image shift means to perform image shift when even-numbered pages of documents are copied.

2. An apparatus according to claim 1, wherein said image forming means includes a reversing means for reversing a copying paper sheet on one surface of which an image is formed.

3. An apparatus according to claim 1, wherein said control means causes said image shift means to perform said shift only when said even-numbered pages of documents are copied.

4. A sync-exposure type copying apparatus comprising:

automatic document feeding means for sequentially and substantially continuously circulating and feeding a plurality of documents to be copied;

image forming means for forming a document image on a copying paper sheet by an electrophotographic process while moving a photosensitive body in synchronism with movement of the documents;

document size detection means for detecting a document size;

copying paper size setting means for setting a copying paper size; and copying speed determining means for determining and setting copying speeds as a function of the detected document size and the set copying paper size;

wherein when the detected document size is equal to the set copying paper size, or when the detected document size is smaller than the set copying paper size, said copying speed determining means sets a first copying speed in accordance with the copying paper size, and when the detected document size is larger than the set copying paper size, said speed determining means sets a second copying speed regardless of the copying paper size whereby said second copying speed is identical to one of said copying speeds set for the condition that the detected document size is equal to the set copying paper size.

5. An apparatus according to claim 4, wherein said document size detection means is included in said automatic document feeding means.

* * * * *